United States Patent

[11] 3,562,547

[72] Inventors Gerald D. Brode
Sayre, Pa.;
James F. Malia, Owego; William K. Mead,
Endicott, N.Y.

[21] Appl. No. 631,533
[22] Filed Apr. 17, 1967
[45] Patented Feb. 9, 1971
[73] Assignee International Business Machines Corporation
Armonk, N.Y.
a corporation of New York

[54] PROTECTION DIODE FOR INTEGRATED CIRCUIT
9 Claims, 8 Drawing Figs.

[52] U.S. Cl. 307/202, 307/213, 307/303; 317/235
[51] Int. Cl. H02h 7/20, H01l 19/00
[50] Field of Search 307/202, 213, 303; 317/235, 22, 22.1

[56] References Cited

UNITED STATES PATENTS

| | | | |
|---|---|---|---|
| 3,134,033 | 5/1964 | Cepuch et al. | 307/202 |
| 3,275,846 | 9/1966 | Bailey | 317/235X |
| 3,230,429 | 1/1966 | Stehney | 307/202X |
| 3,379,940 | 4/1968 | Nakao | 317/235 |
| 3,390,280 | 6/1968 | Thompson | 307/215 |
| 3,404,321 | 10/1968 | Kurosawa et al. | 317/235 |

OTHER REFERENCES

Pub. I. " Integrated Circuits" by Solomon in Electronics World, Vol. 72, No. 3 dated Sept. 1964. pages 27–32.

*Primary Examiner*—Stanley D. Miller
*Attorneys*—Edwin M. Thomas, Ralph L. Thomas and Thomas and Thomas

ABSTRACT: A transistorized single-ended receiver circuit and a double-ended receiver circuit are provided with a protective diode to limit current resulting from overvoltage at the input during operation or normal voltage at the input whenever the receiver circuits are deenergized.

INVENTORS
GERALD D. BRODE
JAMES F. MALIA
WILLIAM K. MEAD

BY Thomas & Thomas
ATTORNEYS

PROTECTION DIODE FOR INTEGRATED CIRCUIT

BACKGROUND OF THE INVENTION

This invention relates to electrical circuits and more particularly to a protective arrangement for preventing damage to such circuits by excessive current resulting either from overvoltage during operation or normal input voltage whenever such circuits are deenergized.

Whenever an integrated circuit has a resistor or the base of a transistor connected to an input terminal, there is inherent in this type of construction, a diode (or in some cases, two series diodes) which becomes forward biased with little or not current limiting function whenever an input signal exceeds the level of the energizing potential sources of the integrated circuitry. A similar condition is presented whenever normal input signal levels are presented to the input of the integrated circuitry and it is powered down, i.e., the sources of operating potential having been reduced to zero. Heretofore this problem has been minimized, at least in part, by providing external, discrete current limiting resistors in series with the input signal source, but this involves providing additional equipment for mounting the additional resistors thereby resulting in a penalty which includes a larger circuit package, increased connections with a concomitant decrease in reliability, and an increase in the cost of manufacture. Another alternative solution to the problem is to allow the resistor isolation region of the integrated circuit to float. This approach, however, results in unpredictable characteristics of the integrated circuitry, and this is not acceptable for many types of circuit applications. Moreover, this alternative is applicable only if there is a series input resistor.

SUMMARY OF THE INVENTION

It is a feature of this invention, therefore, to solve the foregoing problem by providing an isolation or protection diode between a source of operating potential and a resistor or a transistor connected to an input terminal of an electrical circuit whereby such diode becomes reverse biased and presents a large impedance whenever the input signal exceeds the level of the operating potential. The diode serves the protective function when overvoltages are present at the input during the operation of the circuit or whenever normal input voltages are applied thereto and the circuit is powered down, i.e., all sources of operating potential have been reduced to zero.

It is a feature of this invention to provide a novel protective circuit arrangement.

It is another feature of this invention to provide a novel protective circuit for use in integrated circuitry.

It is another feature of this invention to provide a novel protective circuit device for use in a single-ended receiver circuit and a double-ended receiver circuit.

It is further a feature of this invention to provide an emitter-follower amplifier circuit having a novel protective circuit arrangement.

It is another feature of this invention to provide an integrated circuit in the form of a single-ended receiver circuit which has a protective diode arrangement incorporated therein to protect the receiver circuit from the deleterious currents resulting from given input signals.

It is a further feature of this invention to provide an improved integrated circuit arrangement in the form of a double-ended receiver circuit having a protective diode to prevent deleterious currents which might result from given input signals.

The foregoing and other objects, features and advantages of the invention will be apparent from the following more particular description of preferred embodiments of the invention as illustrated in the accompanying drawings.

DESCRIPTION OF THE PREFERRED EMBODIMENTS

Figure 1A:
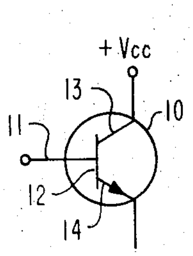
FIGS. 1A through 1C illustrate the construction of a transistor using integrated circuit technology.
Figure 1B:
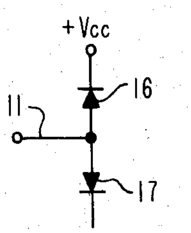
Figure 1C:
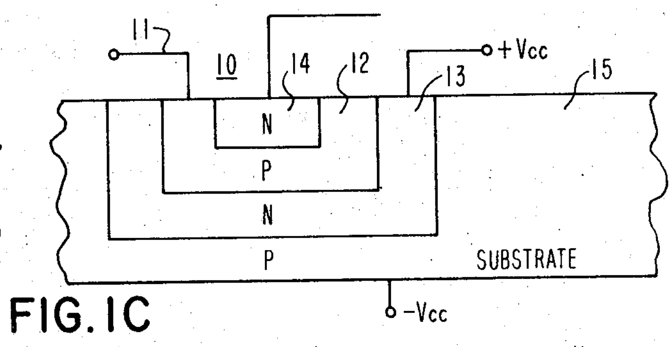

Reference is made to FIG. 1A which illustrates a transistor 10 having an input line 11 connected to a base electrod 12, a collector electrode 13 connected to a source of positive potential, and an emitter electrode 14. The large signal equivalent circuit of the transistor 10 in FIG. 1A is illustrated in FIG. 1B as including diodes 16 and 17 which represent PN junctions within the transistor 10. The diode 16 represents the PN junction of the base-collector circuit, and the diode 17 represents the PN junction of the base-emitter circuit. FIG. 1C illustrates a transistor having NPN regions diffused into a substrate according to integrated circuit technology. The term "integrated circuit" refers generally to a circuit whereby all of the required components such as resistors, diodes and transistors, are realized within a single semiconductor chip or block of material. The transistor 10 in FIG. 1C includes the same reference numerals as employed in FIG. 1A whereby corresponding parts may be more easily identified. FIG. 1C illustrates a cross-sectional view of an integrated circuit construction. The substrate or chip 15 houses all component parts, and the regions 12 through 14 constitute the respective base, collector, and emitter of the transistor 10. The base 12 is made of a P material, and the collector 13 and the emitter 14 are made of N material. The integrated circuit in FIG. 1C may be made by various known manufacturing techniques, and one publication on this subject is a book entitled "Integrated Circuits —Design Principles and Fabrication," edited by Raymond M. Warner, Jr., and published in 1965 by McGraw-Hill Book Company. Accordingly, since integrated circuits and the techniques for their construction are known in the art, further elaboration is not made herein.

Figure 2A:
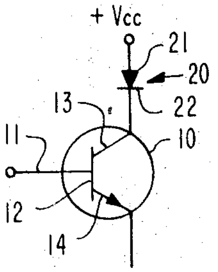
FIGS. 2A through 2C illustrate the construction of a transistor and a protective diode using integrated circuit technology.
Figure 2B:
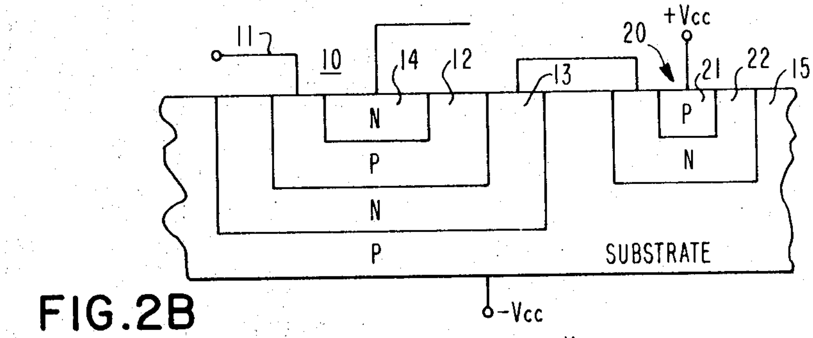
Figures 2C, 7:
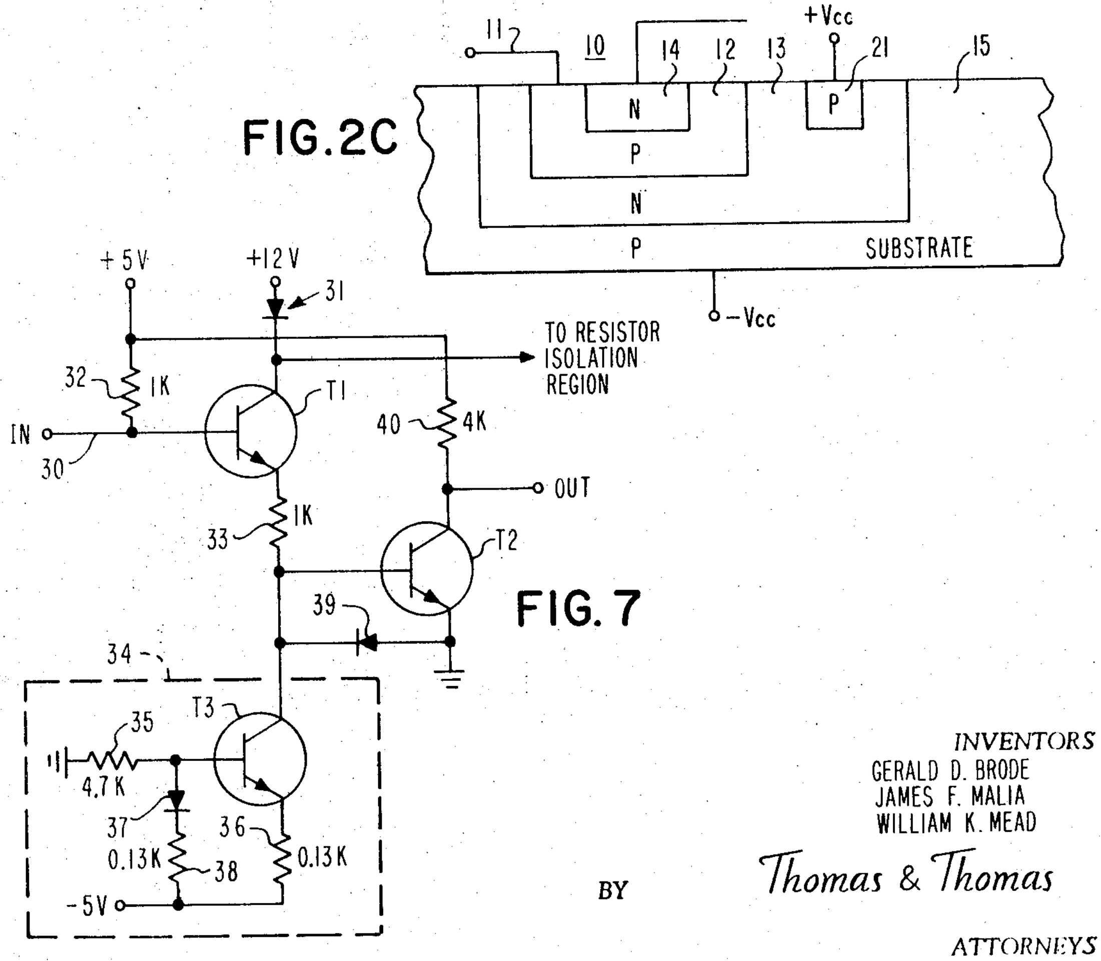
FIG. 7 illustrates a single-ended receiver circuit incorporating a transistor and a protective diode as shown in FIGS. 2A—2C.

If the input signal applied to the base 12 of the transistor 10 of FIG. 1A exceeds the voltage $+V_{cc}$; the base-collector P–N junction becomes forward biased and current may flow to the voltage source $+V_{cc}$. In the equivalent circuit in FIG. 1B, the result is current flow from the input line 11 through the diode 16 to the voltage source $+V_{cc}$. This represents an undesirable situation since the current flow may become excessive and thereby damage the transistor 10. In order to prevent this undesirable current flow, a diode 20 is inserted between the voltage source $+V_{cc}$ and the collector 13, as illustrated in FIG. 2A. The diode includes an anode 21 connected to the source of voltage $+V_{cc}$ and a cathode 22 connected to the collector 13 of the transistor 10. The integrated circuit equivalent of the diode 20 and transistor 10 in FIG. 2A is illustrated in cross section in FIG. 2B where the transistor 10 includes the P region 12, and the N regions 13 and 14. The diode 20 in FIG. 2B includes the P region 21 which serves as the anode and a N region 22 which serves as the cathode. The collector 13 of the transistor 10 is connected to the cathode 22 of the diode 20 of FIG. 2B. The integrated circuit arrangement in FIG. 2C is a cross-sectional view similar to the integrated circuit shown in FIG. 2B with the exception that the N region 13 has been expanded, and the N region 22 in FIG. 2B has been eliminated in FIG. 2C. In essence the collector 13 and the cathode 22 in FIG. 2B are fabricated into a common N region in FIG. 2C.

If the input signal applied to the line 11 in FIG. 2A becomes more positive than the signal source $+V_{cc}$, the P–N junction formed by the base 12 and the collector 13 of the transistor 10 is forward biased to conduct current. However, the N and P junction formed by the cathode 22 and the anode 21 is reverse biased and the P–N junction formed by the base 12 and the collector 13 of the transistor 10 is protected.

Figure 3A:
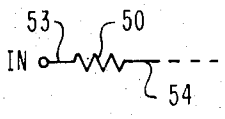
FIGS. 3A through 3C illustrate a resistor constructed according to integrated circuit technology.
Figure 3B:
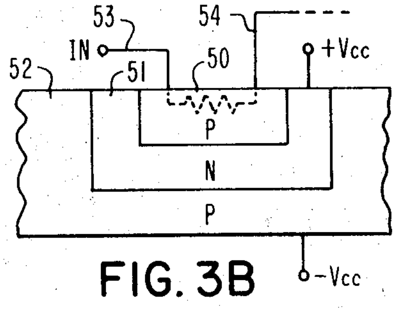

When an integrated circuit has a resistor at the input thereof, it is susceptible to overvoltages at the input because a diode becomes forward biased with little or no current limiting. This is illustrated in FIG. 3. The resistor 50 in FIG. 3A is illustrated by integrated circuit technology in FIG. 3B which is a cross-sectional view. The resistive region 50 in FIG. 3B is isolated by an N region 51 from the substrate 52. A dotted line resistor is disposed in the region 50 to indicate that this P material offers resistance to current flow from the input line 53 to the output line 54. The P region 50 and the isolation region 51 provide a PN junction, and these two regions serve as a diode which is forward biased when the signals on the input line 53 become more positive than the source of operating potential $+V_{cc}$.

It should be pointed out that it is customary in integrated circuitry to connect the chip or substrate to the most negative potential and the N region 51 to the most positive potential. This insures that the NP junction formed by the regions 51 and 52 is reverse biased for normal operating conditions, and the PN junction formed by the regions 50 and 51 is likewise reverse biased for normal operation. Thus, the input signal applied to the line 53 creates no problem unless it exceeds the positive potential applied to the region 51. In this case the PN junction formed by the regions 50 and 51 becomes forward biased with no current limiting, and this constitutes an undesirable condition since damage may result. It should be pointed out that negative signal swings on input line 53 do not create a problem because such swings do not forward bias any of the junctions involved in FIG. 3B.

Figure 3C:
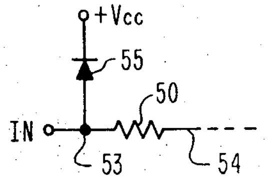
Figure 4A:
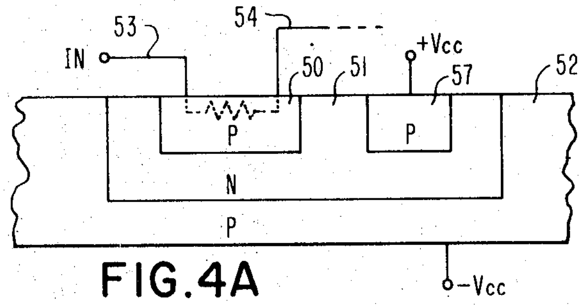
FIGS. 4A and 4B illustrate a resistor and a protective diode constructed according to integrated circuit technology.
Figure 4B:
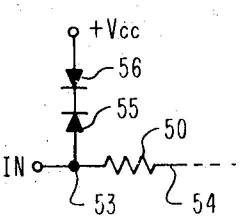
Figure 5:
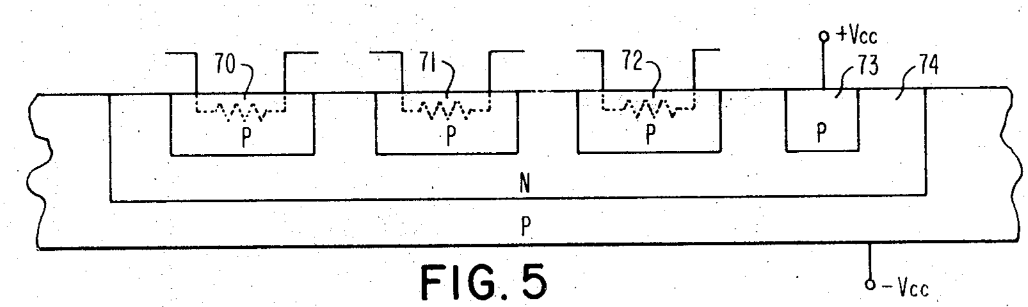
FIG. 5 illustrates a protective diode which may be used in conjunction with a plurality of resistive devices using integrated circuit technology.

The equivalent circuit of the integrated circuit arrangement in FIG. 3B is illustrated in FIG. 3C. The diode formed by the PN junction of the regions 50 and 51 is illustrated as a diode 55 in FIG. 3C. The undesirable effect of the PN junction formed by the regions 50 and 51 in FIG. 3B may be eliminated by inserting an isolation diode, and this may be accomplished by providing an integrated circuit such as illustrated in cross section in FIG. 4A. The region 51 of N material is expanded, and an isolation diode 56 is created by a region of P material 57 disposed as shown. The equivalent circuit of the integrated circuit arrangement in FIG. 4A is illustrated in FIG. 4B, and the equivalent circuit includes the resistor 50 and the diodes 55 and 56 connected as shown. In case the level on the input line 53 in FIG. 4B becomes more positive than the source of voltage $+v_{cc}$, the diode 55 becomes forward biased, but the diode 56 is simultaneously biased in the reverse direction. Consequently, the overvoltage condition on the input line 53 is counteracted by the high impedance of the reverse biased diode 56. In some instances a circuit may include several resistors which need the protection of an isolation diode. In such event all of the resistors might be protected by a single diode. One such arrangement is illustrated in cross section in FIG. 5 where resistor regions 70, 71 and 72 each constitute separate resistors which may be connected in various and different portions of an integrated circuit arrangement. A single diode formed by a region of P material 73 and the common N region 74 provides the protective function.

Figures 6A, 6B, 6C:
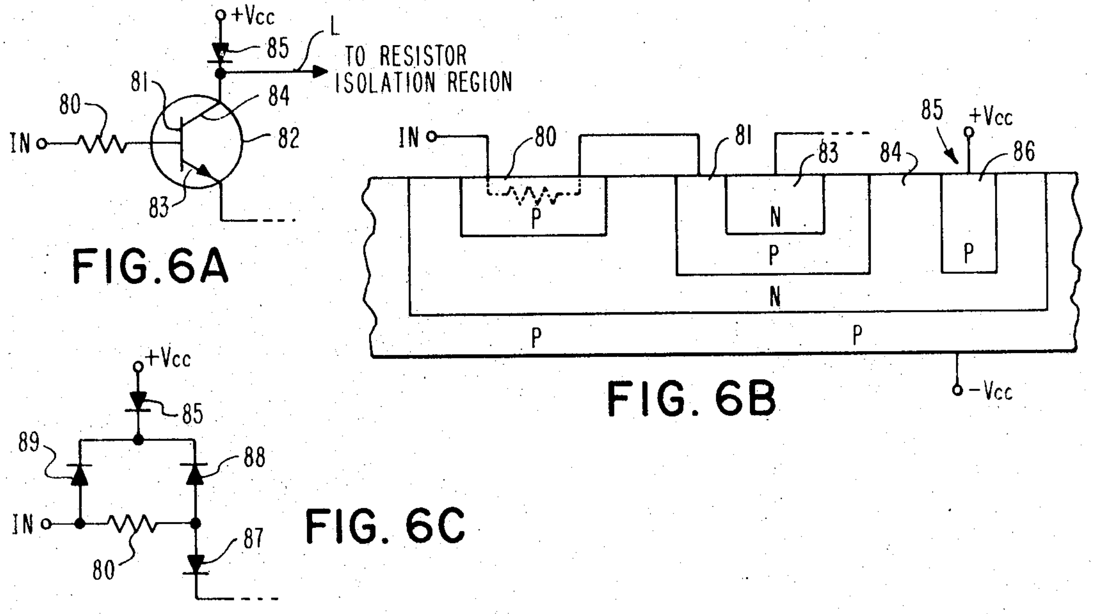
FIGS. 6A through 6C illustrate the construction of the combination of a resistor, a transistor, anda protective diode using integrated circuit the technology.

An integrated circuit which has at its input a resistor or an emitter-follower transistor presents a diode which is forward biased whenever there are positive overvoltages at the input, and there is no current limiting unless an isolation diode is provided. In some instances, it may be desirable to provide an integrated circuit arrangement wherein the input includes both a resistor and an emitter-follower transistor. Such an arrangement is illustrated in FIGS. 6A through 6C. FIG. 6A shows a resistor 80 connected to the base 81 of a transistor 82. The transistor 82 has an emitter 83 and a collector 84, and the collector is connected through an isolation diode 85 to a source of operating potential $+V_{cc}$. The circuit arrangement in FIG. 6A is shown in cross section in FIG. 6B according to integrated circuit technology. The resistive region 80 in FIG. 6B is connected to a region 81 of P material which constitutes the base of the transistor 82. The region 83 of N material in FIG. 6B constitutes the emitter of transistor 82, and the common region 84 of N material constitutes the collector 84, the line L, and the cathode of the diode 85. The region 86 constitutes the 9 anode of the diode 85. The equivalent circuit of the integrated circuit arrangement in FIG. 6B is illustrated in FIG. 6C. It includes the resistor 80 and the diode 85 of FIG. 6A. The equivalent circuit in FIG. 6C includes a diode 87 which represents the base-emitter junction of the transistor 82 and a diode 88 which represents the base-collector junction of the transistor 82. A diode 89 represents the junction of the resistive region 80 of P material and the region 84 of N material in FIG. 6B. It is readily seen from FIG. 6C that when the positive signal at the input of the resistor 80 exceeds the positive value of the supply source $+V_{cc}$, the diodes 88 and 89 become forward biased, but in this situation the diode 85 becomes reverse biased, thereby presenting a high impedance and limiting the current resulting from the positive overvoltage at the input.

Reference is made next to FIG. 7 for an illustration of a single-ended receiver circuit arrangement. The circuit is depicted by conventional symbols of circuit components for ease of illustration, but it is pointed out that in practice the circuit is constructed by integrated circuit technology. An input line 30 receives signal levels which have an up level or a down level. Arbitrarily, the up level is selected to be + 5 volts and the down level arbitrarily is selected to be 0 volts or ground. The input signal levels are pulse signals, having either the up level for a given duration or the down level for the same duration. The signals on the input line 30 are applied to the base of a transistor T1. The collector of the transistor T1 is connected to the cathode of a diode 31, the anode of which is connected to a positive source of potential. The input line 30 is connected through a resistor 32 to a positive signal source. The emitter of the transistor T1 is connected through a resistor 33 to the base of a transistor T2 and the collector of a transistor T3. The components included in the dotted line block 34 constitute a constant current generator. The constant current generator 34 includes the transistor T3 with a resistor 35 connected between its base electrode and ground. A resistor 36 is connected between the emitter electrode of the transistor T3 and a source of negative potential. A diode 37 and a resistor 38 are connected as shown between the base of the transistor T3 and the source of negative potential. Current through the resistor 33 has a substantially constant value because it is connected in series with the constant current generator 34. The transistor T2 has its emitter connected to ground, and a diode 39 is connected between its emitter and the base. The collector of the transistor T2 is connected through a resistor 40 to a source of positive potential.

The constant current source 34 provides a very high impedance at the base of the transistor T2. This permits the majority of the signal swing on the base of the transistor T1 to be transmitted through its emitter and the current limiting resistor 33 to the base of the transistor T2. When the input signal on the input line 30 is up, the transistor T1 conducts, and the positive signal developed on the input line 30 is transmitted to the base of the transistor T2, thereby driving this transistor into conduction. This causes the output voltage at the collector of the transistor T2 to be approximately at ground level except for a slight voltage drop through the transistor T2.

When the input voltage on the line 30 in FIG. 7 swings down to the ground level, this causes the transistor T1 to become nonconductive, and the drop in voltage is translated to the base of the transistor T2, thereby turning this transistor off. The output signal at the collector of the transistor T2 rises and approaches the value of + 5 volts because the resistor 40 is connected to a + 5 volts supply. The diode 39 prevents the emitter-base junction of the transistor T2 from breaking down under the worst off-conditions. That is, the diode 39 serves to clamp the signal level at the base of the transistor T2 at or near ground except for the slight voltage drop across the diode 39.

If the input signal level on the line 30 should exceed the value of + 12 volts, the base-collector junction of the transistor T1 would thereby be forward biased to conduct current. This is an undesirable situation, since it may result in damage to the transistor T1, particularly if the current becomes excessive. However, the diode 31 prevents current flow in the base-collector circuit of the transistor T1 because the diode 31 then is reverse biased. Thus it is seen that the transistor T1 is protected from overvoltage swings in the positive direction. If all of the positive and negative potential sources are reduced to zero in the arrangement of FIG. 7, representing a denergized condition, input signals applied to the line 30 might tend to cause base-collector breakdown of the transistor T1, but such current flow is prevented by the isolation diode 31 which is reverse biased by such input signals on the line 30. It is seen, therefore, that the single-ended receiver circuit in FIG. 7 is protected from positive overvoltages whenever the circuit is energizedand being operated, as well as being protected from normal positive signal swings when this circuit is deenergized by reducing the operating potential sources to zero.

Figure 8:
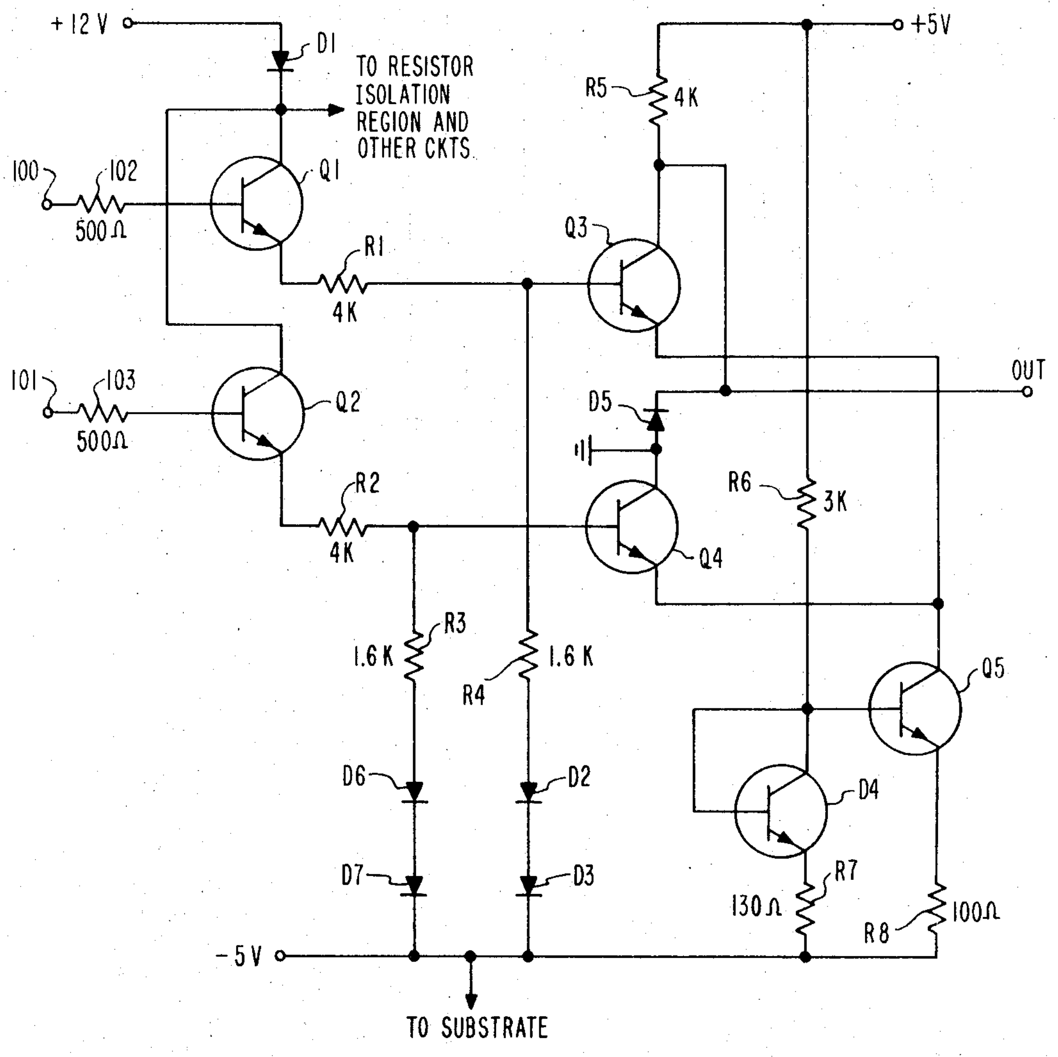
FIG. 8 illustrates a double-ended receiver circuit which utilizes the combination of a resistor, a transistor and a protective diode illustrated in FIGS. 7A—7C.

Reference is made next to FIG. 8 which shows a double-ended receiver circuit arrangement. In practice the device in FIG. 8 is made by integrated circuit technology. The input signal levels are either up or down. Arbitrarily, the input levels may be selected to be + 5 volts when up and 0 volts or ground when down. The input signals are applied to the input terminals 100 and 101. Either signal level may be applied to the input terminal 100 in which case the opposite level is simultaneously applied to the input terminal 101. For example, if the input level applied to the input terminal 100 is + 5 volts, the ground level is applied to the terminal 101. Alternatively, if a signal of + 5 volts, is applied to the input terminal 101, the ground level is applied to the input terminal 100. Input signals applied to the input terminal 100 are connected through a resistor 102 to the base of the transistor Q1, and input signals applied to the input terminal 101 are connected through a resistor 103 to the base of the transistor Q2. Input signals are direct current pulse levels, as explained more fully hereinafter, but the term "connected" as used herein is intended to include AC coupling if AC input signals are employed. The diode D1 provides the current limiting function discussed previously with respect to FIGS. 2 and 6.

Basically, the double-ended receiver is composed of two attenuation networks, a constant current source, and a current switch. The first attenuation network consists of the transistor Q1, the resistor R1 and the resistor R4. The second attenuation network consists of the transistor Q2, the resistor R2, and the resistor R3. The constant current source consists of the resistor R6, the transistor Q5, the transistor D4 which has its collector or and base connected thereby to serve as a diode and the resistors R7 and R8. The diode D4 uses a base-emitter junction. This junction serves to provide temperature compensation of the base-emitter junction of the transistor Q5, thereby to provide a more nearly constant current through the transistor Q5. The current switch includes the transistors Q3 and Q4, the resistor R5, and the diode D5.

The diode D1 is connected as illustrated to the + 12 volts supply. The cathode of this diode is connected to the resistor isolation region of the integrated circuit and to the collectors of the transistors Q1 and Q2 to protect against possible damaging current levels which might result from overvoltages at the input terminals when the circuit is being operated or, if the circuit is deenergized, from input signal levels of a lesser magnitude which might be destructive whenever all power is removed from the circuitry. The cathode of the diode D1 is connected to the resistor isolation region of the resistors R1—R8, and these resistors are preferably disposed in an integrated circuit arrangement in the manner illustrated in FIG. 5. Thus, the diode D1 permits all resistors to be in the same isolation region with no sequencing requirements imposed on the + 5 volts and the + 12 volt power supplies. The diodes D2, D3, D6 and D7 provide a level shift of the attenuated input signals which is required in order to insure that the transistor Q5 of the constant source does not saturate under the worst case conditions.

When the input terminal 100 is supplied with a signal which is + 5 volts, the input terminal 101 is supplied with a signal which is at the ground level. The transistors Q1 and Q2 serve as emitter-followers, and the base of the transistor Q3 is supplied with a potential which is relatively more positive than the potential level supplied to the base of the transitor Q4. The transistor Q3 conducts, but the transistor Q4 does not. The constant current supplied by the transistor Q5 then flows through the transistor Q3. When the constant current through the transistor Q5 exceeds the current supplied through the resistor R5 and the load, the diode D5 conducts and clamps the output at or near ground except for a voltage drop across the diode D5. When the input conditions are reversed, the transistor Q4 conducts and the transistor Q3 does not. In this case, the diode D4 does not conduct, and the output level rises toward the + 5 volt level connected to the upper end of the resistor R5.

Thus, it is seen from the foregoing description that an isolation diode arrangement is effective to limit the effect of the input signals to a circuit arrangement when it is deenergized as well as providing protection from overload voltages at the input when the circuit is operated. This protective feature is especially useful in single-ended receiver circuits as well as double-ended receiver circuits.

The single ended and double ended receiver circuits may be employed in numerous types of equipment especially in fields of communication and data processing. These receiver circuits are particularly useful in an adapter between a central processing unit and an input-output device of a data processing system. One particular advantage of the receiver circuits according to this invention is that they can be turned off by removing the operating potentials, and this electrically separates the central processing unit from the input-output devices of a data processing system.

While the invention has been particularly shown and described with reference to preferred embodiments thereof, it will be understood by those in the art that various changes in form and details may be made therein without departing from the spirit and scope of the invention.

We claim:

1. An integrated circuit device having various electrical components disposed therein, said integrated circuit device including a substrate of a P-type material, a first region of N-type material disposed in a said substrate, a second region of P-type material disposed in said first region of N-type material, said second region constituting a resistor, a third region of P-type material disposed in said first region of N-type material, said third region of P-type material and said first region of N-type material constituting a diode, a source of operating potential having a positive terminal and a negative terminal, the positive terminal of said source of potential being connected to said third region of P-type material and the negative terminal of said operating potential being connected to the substrate, an input terminal connected to the the second region of P-type material constituting a resistor, a signal source connected to the input terminal, whereby the diode formed by the first region of N-type material and the third region of P-type material becomes back-biased whenever the input signal becomes more positive than the positive terminal of said source of operating potential thereby to protect the integrated circuit device from excessive current.

2. The apparatus of claim 1 wherein a plurality of second regions of P-type material are disposed in said first region of N-type material thereby to form a plurality of resistors, and input terminal means connected to each of the resistors thus formed.

3. An integrated circuit including a substrate of P-type material, a first region of N-type material disposed therein, a plurality of second regions of P-type material disposed in said first region of N-type material, each of said second regions of P-type material having first and second terminals connected thereto, each of said second regions of P-type material constituting individual resistors, a third region of P-type material disposed in said first region of N-type material, said first region of N-type material and said third region of P-type material constituting a protective diode, a source of operating potential having a positive terminal connected to said third region and a negative terminal connected to said substrate.

4. A integrated circuit device including a substrate of P-type material, a first region of N-type material disposed in said substrate, a second region of P-type material disposed in said first region of N-type material, a first terminal and a second terminal connected to said second region of P-type material, said second region of P-type material constituting a resistor, a source of input signals connected to said first terminal, a third region of P-type material disposed in said first region of N-type material, said second terminal being connected to said third region of P-type material, a fourth region of N-type material disposed in said third region of P-type material, said first, third and fourth regions constituting a transistor, a fifth region of P-type material disposed in said first region of N-type material, said fifth region and said first region constituting a diode, a source of operating potential having a positive terminal connected to said fifth region and a negative terminal connected to said substrate, whereby said diode protects the integrated circuit whenever the source of input signals exceeds the signal level of the positive terminal of said operating potential source.

5. An electrical device including:

a plurality of electrical components fabricated within a block of material thereby forming an integrated circuit, said electrical device including a first transistor having a base, an emitter and a collector;

an input signal source connected to the base of said first transistor;

a bias source of operating potential, an isolation diode connected between the bias source of operating potential and the collector of said first transistor;

a constant current source, a first resistor connected between the constant current source and the emitter of said first transistor;

a second transistor having a base, an emitter and a collector, the base of said second transistor being connected to the junction of the constant current source and said first resistor;

a second resistor, a second source of operating potential, said second resistor being connected between the collector of the second transistor and the second source of operating potential, the emitter of the second transistor being connected to ground; and a clamping diode connected between ground and the base of said second transistor.

6. An electrical device including a plurality of electrical components fabricated within a block of material thereby forming an integrated circuit, said electrical device including:

first and second transistors connected as emitter-follower devices;

first and second input terminals, first and second resistors, the first resistor being connected between the first input terminal and the base of the first transistor, the second resistor being connected between the second input terminal and the base of the second transistor;

a protective diode, a first source of operating potential, said first diode being connected between the first source of operating potential and the collector electrodes of said first and second transistors;

a current switch including third and fourth transistors connected to the respective first and second transistors, a constant current source connected to the third and fourth transistors;

a second source of operating potential, a third resistor connected between the third transistor and the second source of operating potential; and a load device connected to the third and fourth transistors.

7. An electrical device including:

a plurality of interconnected electrical components fabricated within a single block of material thereby forming an integrated circuit;

said single block of material having a resistive region disposed in a resistor isolation region, an input terminal connected to said resistive region;

a transistor disposed in said single block of material, said transistor including a collector, base and emitter;

a diode disposed in said single block of material;

said resistor isolation region constituting the collector of said transistor, a first region of material disposed in said resistor isolation region constituting the base of said transistor, a second region of material disposed in said first region of material constituting the emitter of said transistor;

said diode including an anode and a cathode, said resistor isolation region constituting the cathode of said diode, a third region of material disposed in said resistor isolation region constituting the anode of said diode;

a source of operating potential connected between the single block of material and said third region thereby to apply said source of operating potential to the collector of said transistor; and whereby said diode disposed within said single block of material isolates the source of operating potential from said collector of said transistor whenever signals at the input terminal exceed the magnitude of the source of operating potential.

8. An electrical device including a plurality of electrical components fabricated within a block of material thereby forming an integrated circuit, said electrical device including:

first and second transistor each having a base, a collector, and an emitter;

first and second input terminals, means connecting the first input terminal to the base of the first transistor, means connecting the second input terminal to the base of the second transistor, a first diode, a first level of operating potential, means connecting said first diode between the first level of operating potential and the collectors of said first and second transistors;

first and second resistors, third and fourth transistors each having a base, a collector, and an emitter, means connecting the first resistor between the emitter of said first transistor and the base of said third transistor, means connecting said second resistor between the emitter of said second transistor and the base of said fourth transistor;

a first network connected between the base of the fourth transistor and a second level of operating potential, said first network including a third resistor, a second diode and a third diode connected in series, a second network connected between the base of said third transistor and said second level of operating potential, said second network including a fourth resistor, a fourth diode and a fifth diode connected in series;

a fifth transistor having a base, a collector, and an emitter, means connecting the collector of said fifth transistor to the emitter of said third transistor and the emitter of said fourth transistor, a fifth resistor, means connecting the fifth resistor between the emitter of the fifth transistor and said second level of operating potential;

a sixth transistor having a base, a collector, and an emitter, a sixth resistor connected between the emitter of said sixth transistor and said second level of operating potential, means connecting the base and the collector of said sixth transistor to the base of said fifth transistor, a seventh resistor connected between the base of said fifth transistor and a third level of operating potential;

an eighth resistor, means connecting said eighth resistor between the collector of said third transistor and said third level of operating potential; and an output terminal, means connecting said output terminal to the collector of said third transistor, a sixth diode, means connecting said sixth diode between ground and said output terminal, and means connecting the collector of said fourth transistor to ground.

9. An electrical device including a plurality of electrical components fabricated within a block of material thereby forming an integrated circuit, said electrical device including:

first and second transistors each having a base, a collector, and an emitter;

first and second input terminals, first and second resistors, the first resistor being connected between the first input terminal and the base of the first transistor, the second resistor being connected between the second input terminal and the base of the second transistor;

a protective diode, a third terminal having a first level of operating potential, said diode being connected between the third terminal and the collector of said first transistor and the collector of the second transistor;

third and fourth resistors, third and fourth transistors each having a base, a collector, and an emitter, said third resistor being connected between the emitter of the first transistor and the base of the third transistor, said fourth resistor being connected between the emitter of the second transistor and the base of the fourth transistor;

fifth and sixth transistors each having a base, a collector, and an emitter, a fourth terminal having a second level of operating potential, a fifth resistor connected between the emitter of the fifth transistor and the fourth terminal, a sixth resistor connected between the emitter of the sixth transistor and the fourth terminal, the base and the collector of said sixth transistor being connected to the base of the fifth transistor;

a fifth terminal having a third level of operating potential, a seventh resistor connected between the base of the fifth transistor and the fifth terminal, the emitter of the third transistor and the emitter of the fourth transistor being connected to the collector of the fifth transistor;

an output terminal connected to the collector of the third transistor, an eighth resistor connected between the collector of the third transistor and said fifth terminal, the collector of the fourth transistor being connected to ground, a second diode connected between ground and the output terminal;

a first impedance network connected between the base of the fourth transistor and the fourth terminal, said first impedance network including a ninth resistor, a first unilateral conducting device, and a second unilateral conducting device connected in series, a second impedance network connected between the base of the third transistor and the fourth terminal, said second impedance network including a tenth resistor, a third unilateral conducting device, and a fourth unilateral cond ucting device connected in series.